United States Patent [19]
Okada et al.

[11] Patent Number: 5,892,747
[45] Date of Patent: Apr. 6, 1999

[54] DISK DRIVE UNIT WITH A DUSTPROOF CAP ATTACHED TO A BODY MODULE TO PROTECT INTERNAL COMPONENTS FROM DUST

[75] Inventors: Yasushi Okada; Hideo Inuzuka; Shuichi Honda, all of Kanagawa, Japan

[73] Assignee: Ricoh Company, Ltd., Tokyo, Japan

[21] Appl. No.: 664,504

[22] Filed: Jun. 17, 1996

[30] Foreign Application Priority Data

Jun. 29, 1995 [JP] Japan ..................................... 7-164027
Jan. 8, 1996 [JP] Japan ..................................... 8-000830

[51] Int. Cl.⁶ .................................................. G11B 33/14
[52] U.S. Cl. ....................................... 369/75.1; 360/97.02
[58] Field of Search ................................... 369/75.1, 75.2; 360/97.01, 97.02; 361/736, 748, 752; 277/635, DIG. 910

[56] References Cited

U.S. PATENT DOCUMENTS

| | | | |
|---|---|---|---|
| 5,255,254 | 10/1993 | Watanabe et al. | 369/75.1 |
| 5,297,116 | 3/1994 | Ikuma | 369/75.1 |
| 5,297,122 | 3/1994 | Christie | 369/75.1 X |
| 5,418,775 | 5/1995 | Okatani | 369/75.1 X |
| 5,617,404 | 4/1997 | Okada | 369/75.1 X |
| 5,633,849 | 5/1997 | Konno et al. | 369/75.1 |

FOREIGN PATENT DOCUMENTS

| | | | |
|---|---|---|---|
| 5-266647 | 10/1993 | Japan . | |
| 6-195961 | 7/1994 | Japan . | |
| 6-203547 | 7/1994 | Japan | 369/75.1 |
| 6-295576 | 10/1994 | Japan . | |

Primary Examiner—William R. Korzuch
Attorney, Agent, or Firm—Dickstein Shapiro Morin & Oshinsky, LLP

[57] ABSTRACT

In a disk drive unit, a top cover, a front cover and a loading base attached with a body module cooperatively form a substantially closed receiving space for an optical disk. The front cover is provided with a dustproof shutter which closes the foregoing receiving space except upon insertion or ejection of an optical disk cartridge including therein the optical disk. Further, a dustproof cap is attached to the body module so as to cover the underside of the body module where a circuit board is disposed for processing signals relative to an optical head. A hermetically closed space is formed between the underside of the body module and the dustproof cap, in which the circuit board is accommodated.

26 Claims, 12 Drawing Sheets

DISK DRIVE UNIT WITH A DUSTPROOF CAP ATTACHED TO A BODY MODULE TO PROTECT INTERNAL COMPONENTS FROM DUST

BACKGROUND OF THE INVENTION

1. Field of the Invention

The present invention relates to a disk drive unit, such as an optical disk drive unit or a photomagnetic disk drive unit, for recording or reproducing information relative to a disk-shaped recording medium.

2. Description of the Prior Art

An example of a conventional disk drive unit, such as a photomagnetic disk drive unit, is described in Japanese First (unexamined) Patent Publication No. 6-195961. In this photomagnetic disk drive unit, a casing of the drive unit body is formed with an opening through which a radiator portion of an external magnetic field device is exposed to the exterior for effective heat radiation of an external magnetic field device. Further, a gap between the opening and the external magnetic field device is sealed by a closing member which expands or contracts depending on movement of the external magnetic field device.

Another example of an optical disk drive unit is described in Japanese First (unexamined) Patent Publication No. 6-295576. In this optical disk drive unit, an elastic sealing member is disposed between a base and a base cover so as to provide a closed structure of a casing which is formed by the base and the base cover. Further, a flexible printed circuit (FPC) board is used as a cable for connection to the exterior. The FPC is held between the base and the sealing member, with both end portions of the FPC board having an acute angle in section, so as to ensure a complete seal between the FPC board and the sealing member.

However, since each of the foregoing disk drive units aims to provide a closed structure for the whole casing, dust entering the casing upon insertion or ejection of a disk-shaped recording medium is diffused all over the inside of the casing so as to adhere to various internal components. Accordingly, dust accumulates on the optical head and circuit board over time. Mounted on the circuit board are components which may be subject to premature failure due to this accumulated dust, such as a primary amplifier for amplifying/modulating input/output signals relative to an optical head.

Further, to seal the entire casing, a large number of sealing members are required for sealing between the components which comprise the casing. This complicates the sealing structure maling the assembly of the casing relatively difficult.

SUMMARY OF THE INVENTION

It is an object of the present invention to provide a disk drive unit which facilitates its assembling operation, includes a sealing structure with a particularly high dustproof property relative to the internal components and minimizes the thickness of the drive unit caused by providing such a sealing structure.

According to one aspect of the present invention, a disk drive unit comprises a casing having an insertion/ejection opening; a loading mechanism for holding a disk-shaped recording medium inserted through the insertion/ejection opening on a plate-like loading base so as to transfer it to a recording/reproducing position; a recording/reproducing head for recording/reproducing information relative to the disk-shaped recording medium transferred to the recording/reproducing position; a circuit board for processing an input/output signal relative to the recording/reproducing head; a body module mounted at least with the recording/reproducing head and the circuit board and attached to an underside of the loading base so as to cover an opening of the loading base; a printed-wiring board electrically connected to the circuit board; a dustproof member for forming a receiving space for the disk-shaped recording medium cooperatively with the loading base attached with the body module; and a dustproof cap attached to the body module so as to cover an underside of the body module where the circuit board is mounted.

Another aspect of the invention is that the dustproof member substantially closes the receiving space except upon insertion/ejection of the diskshaped recording medium.

Another aspect of the invention is that a component mounting surface of the printed-wiring board confronts the underside of the loading base.

Another aspect of the invention is that the dustproof cap is made of nonconductive resin.

Another aspect of the invention is that an elastic lower sealing member seals between the body module and the dustproof cap, and that an elastic upper sealing member seals between the body module and the loading base.

Another aspect of the invention is that a flange-like press-in plate is projected from an outer side surface of the body module, that the upper sealing member is compressed between the underside of the loading base and an upper side of the press-in plate, and that the lower sealing member is compressed in the dustproof cap between the dustproof cap and an underside of the press-in plate.

Another aspect of the invention is that the dustproof cap includes a through hole with its inner surface coated with a conductive material, that a cable connected to the circuit board is soldered to a portion of the conductive material extending out from the through hole and coated on an inner surface of the dustproof cap, and that a cable connected to the printed-wiring board is soldered to a portion of the conductive material extending out from the through hole and coated on an outer surface of the dustproof cap.

Another aspect of the invention is that a terminal pin made of a conductive material penetrates the dustproof cap, that a cable connected to the circuit board in the dustproof cap is soldered to one end of the terminal pin, and that a cable connected to the printed-wiring board outside the dustproof cap is soldered to the other end of the terminal pin.

Another aspect of the invention is that the dustproof cap includes a cable insertion hole, that a sealed space in the dustproof cap is screened from the cable insertion hole by the lower sealing member, and that a flexible cable connecting between the circuit board and the printed-wiring board passes between the lower sealing member and the dustproof cap and further passes through the cable insertion hole.

Another aspect of the invention is that the dustproof cap includes a cable insertion hole, that a sealed space in the dustproof cap is screened from the cable insertion hole by the lower sealing member, and that a flexible cable connecting between the circuit board and the printed wiring board passes through a slit formed in the lower sealing member and further through the cable insertion hole.

Another aspect of the invention is that the dustproof cap is provided with a projection portion near the cable insertion hole for holding the lower sealing member in place.

Another aspect of the invention is that a thickness of the lower sealing member with no deformation is set greater than a holding width of the projection portion.

Another aspect of the invention is that the dustproof cap includes a cable insertion hole, that a sealed space in the dustproof cap is screened from the cable insertion hole by the lower sealing member, that the lower sealing member has a divided structure near the cable insertion hole, the divided structure including a body portion and a divided piece, and that a flexible cable connecting between the circuit board and the printed-wiring board passes between the body portion and the divided piece and further through the cable insertion hole.

Another aspect of the invention is that a minimum width of mutually abutting surfaces of the divided piece and the body portion in an insertion direction of the flexible cable is set greater than a width of the upper sealing member, that the flexible cable is bent in the dustproof cap along an edge portion of one of the body portion and the divided piece, and that at least a portion of the edge portion abutting the flexible cable is formed linear.

Another aspect of the invention is that each of the upper sealing member and the lower sealing member is made of a conductive material.

Another aspect of the invention is that the dustproof cap is provided with a high-rigidity fixed claw above the cable insertion hole for engaging the body module, and that the dustproof cap is further provided with an elastic claw at a position being in the interior facing in the direction of the fixed claw, the elastic claw deformable to an engaging position for engaging the body module and a disengaging position for releasing the body module.

According to another aspect of the present invention, a disk drive unit comprises a casing having an insertion/ejection opening; a loading mechanism for holding a disk-shaped recording medium inserted through the insertion/ejection opening on a plate-like loading base so as to transfer it to a recording/reproducing position; a recording/reproducing head for recording/reproducing information relative to the disk-shaped recording medium transferred to the recording/reproducing position; a circuit board for processing an input/output signal relative to the recording/reproducing head; a body module mounted at least with the recording/reproducing head and the circuit board and attached to an underside of the loading base so as to cover an opening of the loading base; a printed-wiring board electrically connected to the circuit board; a dustproof member for forming a receiving space for the disk-shaped recording medium cooperatively with the loading base attached with the body module; and a dustproof cap attached to the body module so as to cover an underside of the body module where the circuit board is mounted, the dustproof cap including a cap body, the cap body formed with an opening at its bottom confronting the circuit board and ensuring a clearance relative to a component mounted on the circuit board by means of the opening in a state where the cap body is fixed to the body module, the dustproof cap further including a plate-like member bonded to an underside of the cap body for closing the opening.

Another aspect of the invention is that the recording/reproducing head is arranged on the body module at a position confronting the disk-shaped recording medium and movable in a radial direction of the disk-shaped recording medium, that the recording/reproducing head is connected to the circuit board arranged at the underside of the body module by means of a flexible cable having a length which allows movement of the recording/reproducing head, and that a cable holding portion is provided at the bottom of the cap body confronting the circuit board for holding a bent portion of the flexible cable which moves depending on a position of the recording/reproducing head.

Another aspect of the invention is that the circuit board and the printed-wiring board are connected to each other by means of a flexible cable, the flexible cable having one end connected to a connector member on the circuit board and being bent into a U-shape in the dustproof cap so as to extend out from the dustproof cap, and that the flexible cable is constrained at a position adjacent to the connector member on the circuit board for preventing the flexible cable from moving toward the plate-like member in the cap body.

Another aspect of the invention is that a soldering pattern is formed on the circuit board adjacent to the connector member, that the flexible cable is provided with a soldering pattern piece which can be soldered relative to the soldering pattern, and that the soldering pattern piece is soldered to the soldering pattern for preventing the flexible cable from moving toward the plate-like member in the cap body.

Another aspect of the invention is that the circuit board and the printed-wiring board are connected to each other by means of a flexible cable, the flexible cable having one end connected to a connector member on the circuit board and being bent into a U-shape in the dustproof cap so as to extend out from the dustproof cap, that the connector member is fixed onto the circuit board by a metal filing member soldered onto the circuit board, and that a soldering pattern piece provided at the flexible cable is soldered to the metal fixing member for preventing the flexible cable from moving toward the plate-like member in the cap body.

Another aspect of the invention is that the circuit board and the printed-wiring board are connected to each other by means of a flexible cable, the flexible cable having one end connected to a connector member on the circuit board and being bent into a U-shape in the dustproof cap so as to extend out from the dustproof cap, that the circuit board is formed with a slit confronting the plate-like member and penetrating from a mounting surface of the circuit board on which the connector member is mounted, to a backside of the circuit board, and that a bent portion of the flexible cable passes the slit from the mounting surface to the backside so that the flexible cable extends out to the exterior of the dustproof cap from the backside of the circuit board.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings. The same or like components are assigned the same reference signs or symbols throughout the figures.

Figure 1:
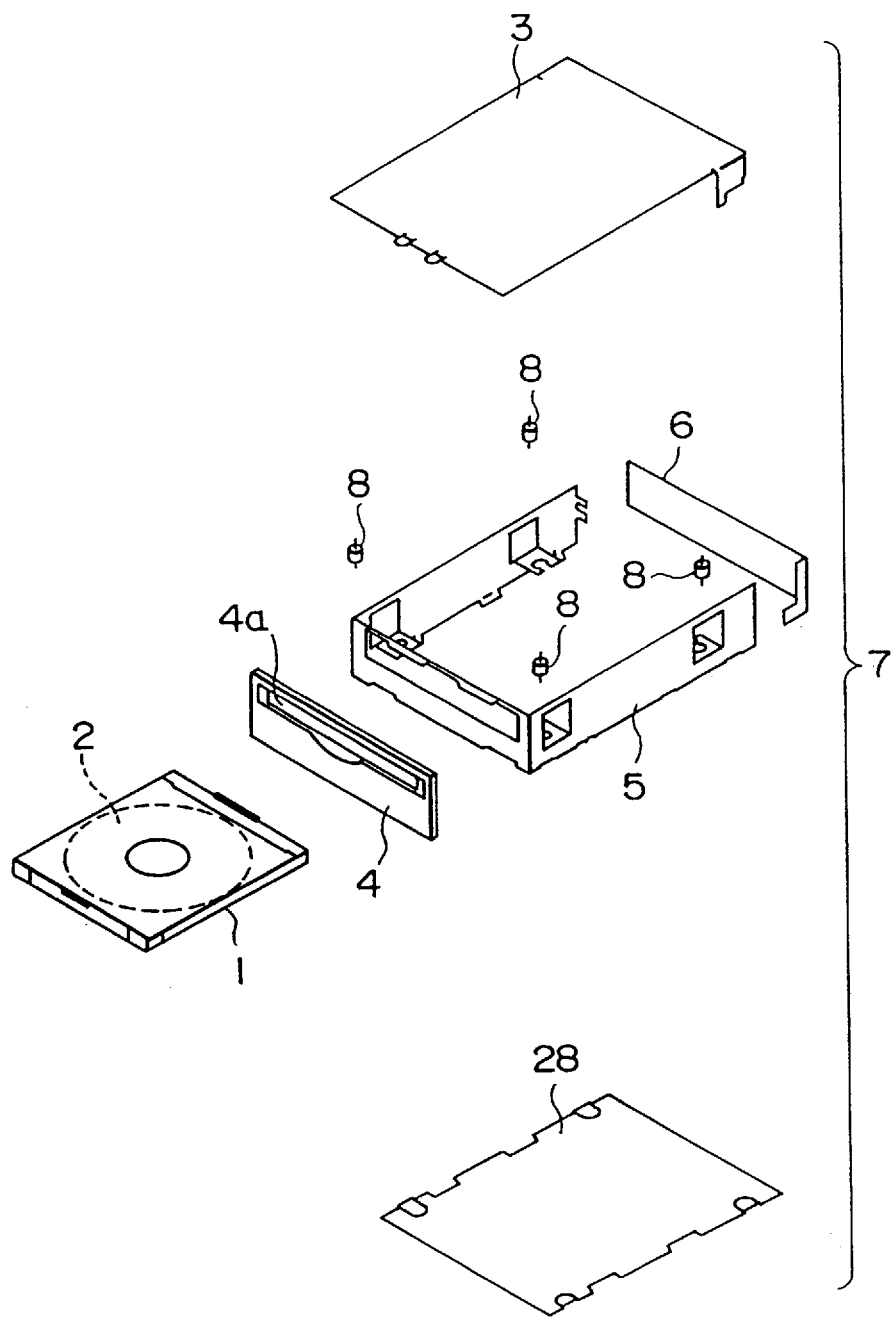
FIG. 1 is an exploded perspective view showing a casing of an optical disk drive unit according to a first preferred embodiment of the present invention.
Figure 2:
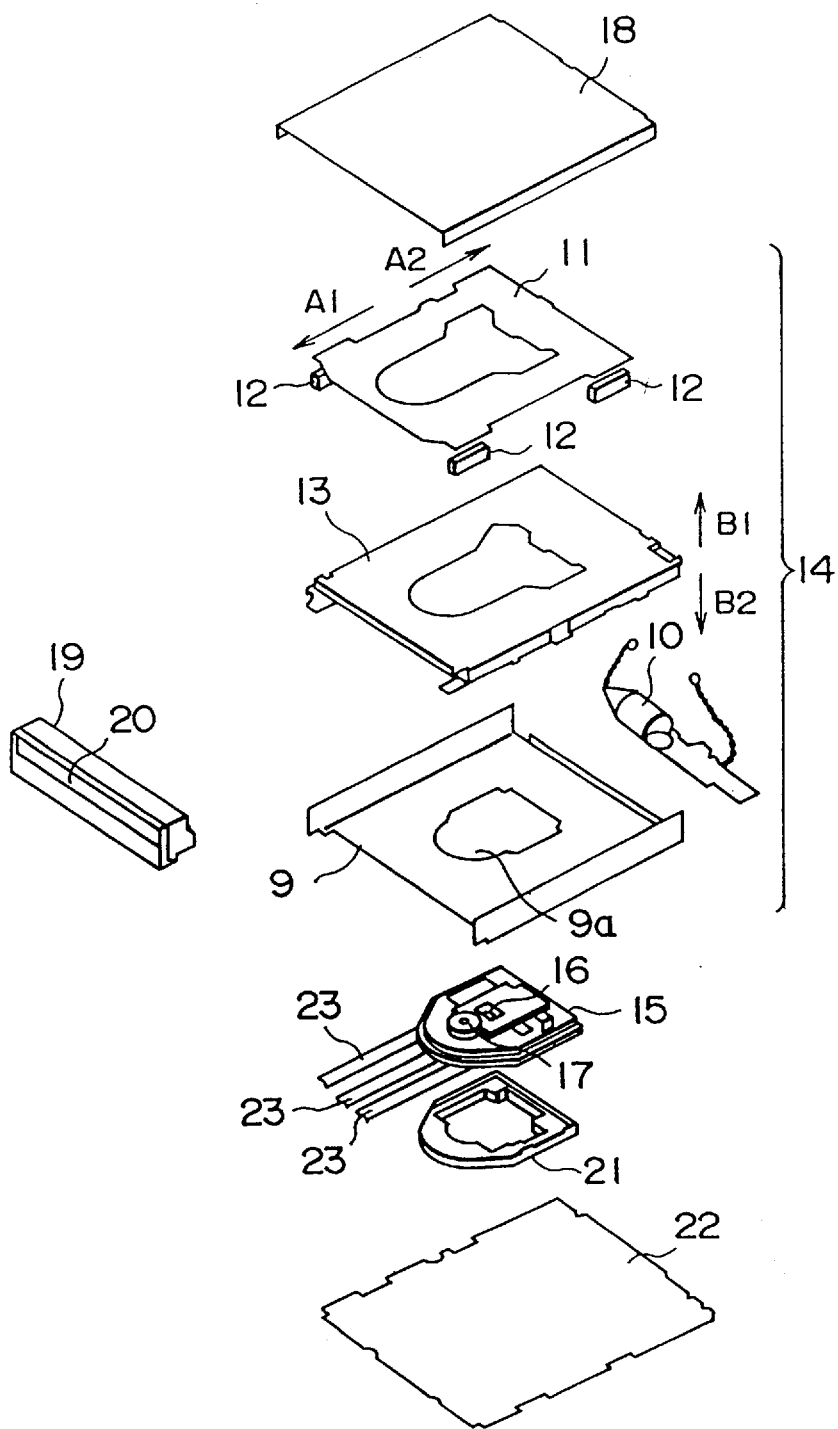
FIG. 2 is an exploded perspective view showing a body of the optical disk drive unit according to the first preferred embodiment.
Figure 3:
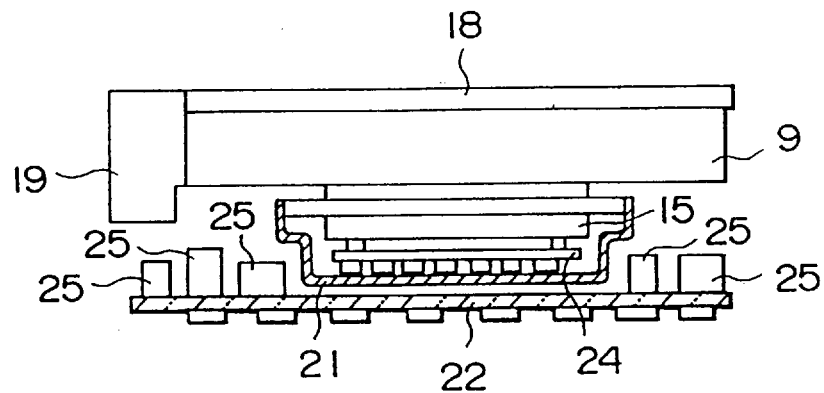
FIG. 3 is a sectional side view showing a main portion of the optical disk drive unit according to the first preferred embodiment.

FIG. 1 is an exploded perspective view showing a casing of an optical disk drive unit according to a first preferred embodiment of the present invention. FIG. 2 is an exploded perspective view showing a body of the optical disk drive unit according to the fist preferred embodiment. FIG. 3 is a sectional side view showing a main portion of the optical disk drive unit according to the first preferred embodiment.

In FIG. 1, numeral 1 denotes an optical disk cartridge receiving therein an optical disk 2 as being a disk-shaped recording medium, and numerals 3, 4, 5, 6 and 28 which constitute a top cover, a face panel, a frame, a rear plate and an under cover, respectively, constituting a casing 7. In the frame 5, a later-described loading mechanism is mounted via rubber cushions 8. Further, the face panel 4 is formed with an opening 4a for inserting or ejecting the optical disk cartridge 1 relative to the inside of the casing 7.

In FIG. 2, numeral 9 denotes a loading base formed with an opening 9a, numeral 10 a loading motor unit disposed on the loading base 9, numeral 11 a carrier supported on the loading base 9 so as to be movable forward and rearward (directions identified by arrows A1 and A2) and engaging the loading motor unit 10, numeral 12 cam members fixed to the corners of the carrier 11, and numeral 13 a holder supported on the loading base 9 so as to be movable upward and downward (directions identified by arrows B1 and B2) and engaging the cam members 12. These members 9 to 13 constitute the loading mechanism 14. Numeral 15 denotes a body module attached to the underside of the loading base 9 so as to close the opening 9a. On the body module 15 are mounted an optical head 16 for applying a laser beam onto the optical disk 2 so as to record or reproduce information relative to the optical disk 2, a spindle motor 17 coupled to the optical disk 2 at a recording/reproducing position, a later described circuit board, and others.

Numerals 18 and 19 denote a dust cover and a front cover, as being dustproof members, respectively. The dust cover 18 and the front cover 19 form a receiving space for the optical disk 2, cooperatively with the loading base 9 attached with the body module 15. The front cover 19 is provided with a dustproof shutter 20 which opens and closes in response to Insertion/ejection operations of the optical disk cartridge 1. During recording or reproduction relative to the optical disk 2, the dustproof shutter 20 is closed so that the receiving space defined by the dust cover 18, the front cover 19 and the loading base 9 is essentially closed or sealed. Numeral 21 denotes a dustproof cap attached by a snap fit to the body module 15 so as to cover the whole underside of the body module 15, and numeral 22 denotes a printed-wiring board electrically connected to the circuit board arranged at the underside of the body module 15 by means of FPC (flexible printed circuit) boards 23 used as flexible cables. The printed-wiring board 22 is fixed to the frame 5 in the casing 7 with its upper side facing the underside of the loading base 9.

As shown in FIG. 3, at least the circuit board 24 is arranged at the underside of the body module 15. The circuit board 24 is hermetically enclosed in a space defined by the body module 15 and the dustproof cap 21. On the circuit board 24, is mounted a primary amplifier for amplifyig an output signal from the optical head 16, a modulating circuit for modulating an output signal relative to the optical head 16, a control circuit for controlling the spindle motor 17 and the like. The printed-wiring board 22 is formed at its upper side with mounting surfaces on which electrical or electronic components 25 are mounted. As described above, since the upper side of the printed-wiring board 22 faces the underside of the loading base 9 and the body module 15 is attached to the underside of the loading base 9, a space which is higher than at least a height of the body module 15 is ensured on the printed-wiring board 22 at a region which does not confront the body module 15. Thus, by disposing the relatively high components 25 at that non-confronting region, the layout of the components 25 on the printed-wiring board 22 is facilitated, and further, the increment of the height of the drive unit can be avoided which would be otherwise caused by mounting the relatively high components 25.

Further, for suppressing the height of the drive unit, it is preferable to narrow a gap between the underside of the dustproof cap 21 and the upper side of the printed-wiring board 22 as much as possible. However, when the distance between the underside of the dustproof cap 21 and the upper side of the printed-wiring board 22 is small, since the loading base 9 is mounted on the fame 5 via the rubber cushions 8, it is possible that the loading base 9 moves due to an impact or the like to the drive unit to cause the underside of the dustproof cap 21 to abut the printed-wiring board 22, thereby causing short circuit between wirings on the printed-wiring board 22. Therefore, in this preferred embodiment, the dustproof cap 21 is made of non-conductive resin so as to prevent the short circuit of the printed-wiring board 22 even in abutment with the dustproof cap 21. This arrangement makes it possible to narrow the gap between the underside of the dustproof cap 21 and the upper side of the printed wiring board 22.

Now, an operation of the optical disk drive unit according to this preferred embodiment will be briefly described hereinbelow.

By inserting the optical disk cartridge 1 into the casing 7 via the opening 4a of the face panel 4, the dustproof shutter 20 of the front cover 19 is opened. By inserting the optical disk cartridge 1 fully into the holder 13 via the dustproof shutter 20, the dustproof shutter 20 is closed. Thereafter, the loading motor unit 10 starts to be operated. By means of the loading motor unit 10, the holder 13 moves downward in the direction B2 so as to transfer the optical disk 2 in the optical disk cartridge 1 to a recording/reproducing position. Then, the spindle motor 17 engages with the optical disk 2, and the optical head 16 applies a laser beam corresponding to a recording signal onto the optical disk 2 so as to record the information or detects reflected light from the optical disk 2 for conversion into a reproduction signal.

Since the reproduction signal from the optical head 16 and a drive signal to a laser beam source of the optical head 16 are weak, they are susceptible to influence of electromagnetic wave noise. If the noise is superimposed on the drive signal or the reproduction signal which is an input or output signal relative to the optical head 16, a recording/reproducing error may be caused. For preventing an occurrence of such a recording/reproducing error, it is effective to shorten a length of signal lines (not shown) constituted by the flexible cables for transmitting the input/output signal relative to the optical head 16. Therefore, in this preferred embodiment, the circuit board 24 for amplifyig/modulating the input/output signal relative to the optical head 16 is arranged at the underside of the body module 15 so as to achieve shortening of the length of the signal lines.

According to the optical disk drive unit of this preferred embodiment, the dust cover 18 and the front cover 19 form the receiving space for the optical disk 2 cooperatively with the loading base 9 attached with the body module 15, and this receiving space is essentially closed except upon insertion or ejection of the optical disk 2. Thus, invasion of the dust entering the casing 7 further into the receiving space for the optical disk 2 is effectively suppressed. Further, invasion of the dust into the receiving space for the optical disk 2 from the exterior is prevented except upon insertion or ejection of the optical disk 2. Accordingly, since adhesion of the dust onto the optical disk 2 in the receiving space, the optical head 16 or the like can be suppressed, the recording/reproducing error and the failure due to adhesion of the dust onto the optical disk 2, the optical head 16 or the like can be prevented. Further, since the dustproof cap 21 is attached to the body module 15 so as to cover the underside thereof, the essentially hermetically closed space is formed between the underside of the body module 15 and the dustproof cap 21 so that adhesion of the dust onto the circuit board 24 arranged at the underside of the body module 15 is prevented. This prevents the failure of the drive unit due to adhesion of the dust onto the circuit board 24.

Figure 4:
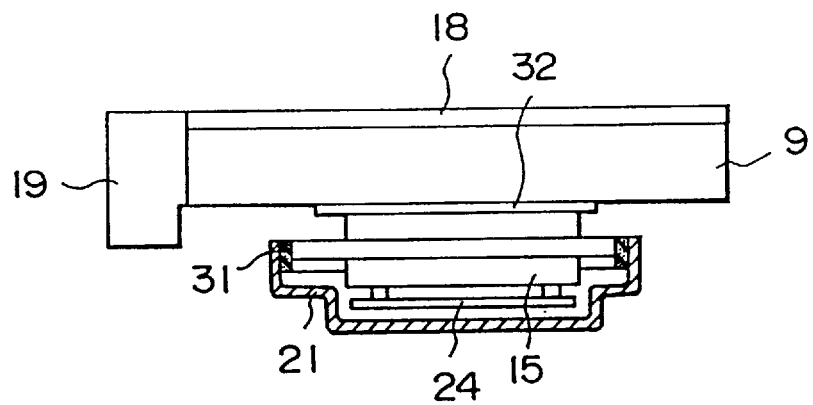
FIG. 4 is a sectional side view showing a main portion of an optical disk drive unit according to a second preferred embodiment of the present invention.

FIG. 4 is a sectional side view showing a main portion, corresponding to FIG. 3, of an optical disk drive unit according to a second preferred embodiment of the present invention. In the figure, numerals 31 and 32 denote a lower sealing member and an upper sealing member each made of an elastic sponge-like material. The lower sealing member 31 of a ring shape is inserted in a compressed state between the outer circumference of the body module 15 and the inner circumference of the dustproof cap 21. On the other hand, the upper sealing member of a ring shape is inserted in a compressed state between the neighborhood of the upper end of the body module 15 and the rim of the opening 9a of the loading base 9.

If the loading base 9, the body module 15 and the dustproof cap 21 are manufactured with high dimensional accuracy, respectively, gaps at joint portions between them can be very small to prevent the dust from passing there through. On the other hand, when manufacturing the loading base 9, the body module 15 and the dustproof cap 21 with such high accuracy, the manufacturing costs thereof become so high. Further, since even a slight dimensional error makes the assembling impossible, the manufacturing yields of those members are lowered. Therefore, it is preferable that the assembly of the loading base 9, the body module 15 and the dustproof cap 21 allows a dimensional error to a certain degree.

Accordingly, in this preferred embodiment, the elastic sealing members 31 and 32 are inserted between the body module 15 and the dustproof cap 21 and between the body module 15 and the loading base 9. With this arrangement, even if there exists a gap due to a dimensional error between the body module 15 and the dustproof cap 21, since passage of the dust is prevented by means of the lower sealing member 31, invasion of the dust into the dustproof cap 21 is prevented. Similarly, even if there exists a gap due to a dimensional error between the body module 15 and the loading base 9, since passage of the dust is prevented by means of the upper sealing member 32, invasion of the dust into the receiving space for the optical disk 2 is prevented.

Figure 5:
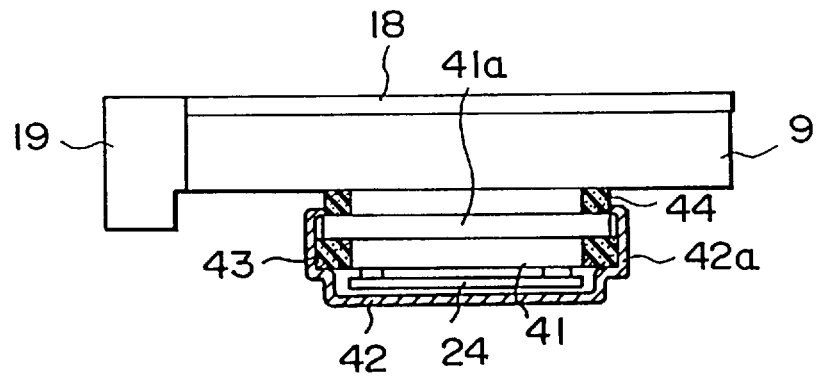
FIG. 5 is a sectional side view showing a main portion of an optical disk drive unit according to a third preferred embodiment of the present invention.

FIG. 5 is a sectional side view showing a main portion, corresponding to FIG. 3, of an optical disk drive unit according to a third preferred embodiment of the present invention. In the figure, numeral 41 denotes a body module with a flange-like press-in plate 41a projecting from and extending over the outer circumference of the body module 41, numeral 42 a dustproof cap with a step 42a formed on the inner circumference thereof, and numerals 43 and 44 a lower sealing member and an upper sealing member each made of an elastic sponge-like conductive material. The conductive material helps prevent spurious signals entering and leaving the sealed area, and is electrically grounded through the metal portions of 41a which in turn is electrically grounded to the casing of the device.

The ring-shaped lower sealing member 43 is inserted in a compressed state between the underside of the press-in plate 41a and the upper side of the step 42a in the dustproof cap 42. On the other hand, the ring-shaped upper sealing member 44 is inserted in a compressed state between the upper side of the press-in plate 41a and the underside of the loading base 9.

In this preferred embodiment, since a contact area with the lower sealing member 43 at a joint portion between the body module 41 and the dustproof cap 42 is increased by means of the press-in plate 41a and the step 42a, the sealing effect at the joint portion between the body module 41 and the dustproof cap 42 is improved as compared with the sealing structure shown in FIG. 4. Thus, invasion of the dust into the dustproof cap 42 is reliably prevented. Further, since a contact area with the upper sealing member 44 at a joint portion between the body module 41 and the loading base 9 is increased by means of the press-in plate 41a and the underside of the loading base 9, the sealing effect at the joint portion between the body module 41 and the loading base 9 is improved as compared with the sealing structure shown in FIG. 4. Thus, invasion of the dust into the receiving space for the optical disk 2 via the gap between the opening 9a of the loading base 9 and the body module 41 can be reliably prevented. Further, when assembling, by placing the lower sealing member 43 on the upper side of the step 42a and then attaching the dustproof cap 42 to the body module 41, the lower sealing member 43 can be fixed at the joint portion in a compressed state, and further, by placing the upper sealing member 44 on the upper side of the press-in plate 41a and then attaching the body module 41 to the loading base 9, the upper sealing member 44 can be fixed to the loading base 9 in a compressed state. Thus, the assembling is facilitated. Further, since each of the sealing members 43 and 44 is made of the conductive material, the electromagnetic wave noise is screened by means of the sealing members 43 and 44 so that the influence of the electromagnetic wave noise to the circuit board 24 in the dustproof cap 42 can be suppressed.

Figure 6A:
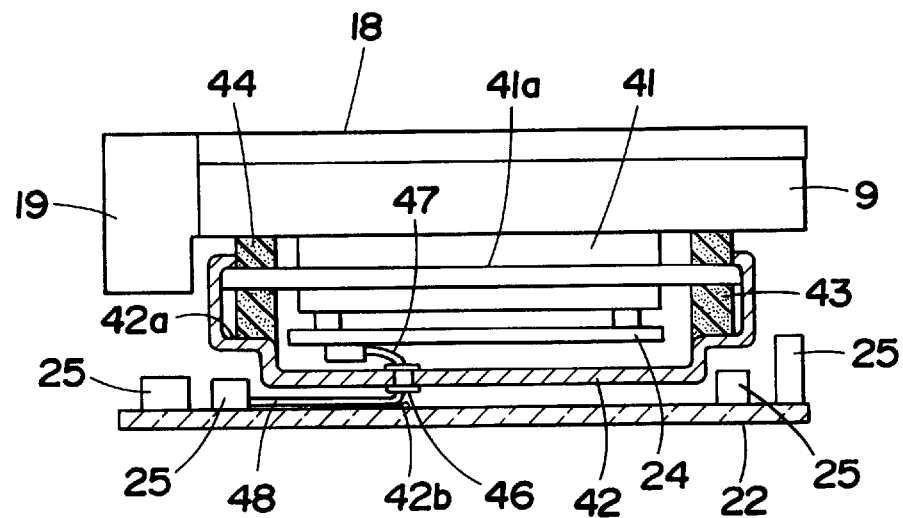
FIG. 6a is a sectional side view showing a main portion of an optical disk drive unit according to a fourth preferred embodiment of the present invention.
Figure 6B:
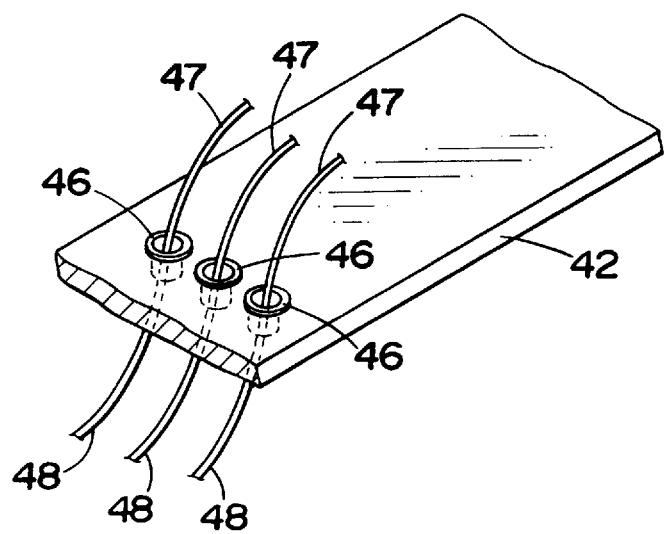
FIG. 6b is a perspective view of a dustproof cap according to a fourth preferred embodiment of the present invention.

FIG. 6a is a sectional side view showing a main portion, corresponding to FIG. 3, of an optical disk drive unit according to a fourth preferred embodiment of the present invention. In the figure, numeral 42b denotes at least one through hole penetrating the bottom of the dustproof cap 42. Typically, there is a plurality of through holes, with one through hole for each conductor of a cable that must pass through the cap, as shown in FIG. 6b. The inner circumference of the through hole 42b is coated with a conductive material 46 by plating, solder or the like. Both ends of the conductive material 46 extending out from the inner circumference of the through hole 42b are coated on the inner and outer surfaces of the dustproof cap 42, respectively. A cable 47 connected to the circuit board 24 is soldered to the end portion of the conductive material 46 in the dustproof cap 42 so as to close the through hole 42b. Further, a cable 48 connected to the printed-wiring board 22 is soldered to the end portion of the conductive material 46 outside the dustproof cap 42 so as to close the through hole 42b.

In this preferred embodiment, the dustproof cap 42 is provided with the through hole 42b having the inner circumference coated with the conductive material 46, the cable 47 connected to the circuit board 24 is soldered to the conductive material 46 extending out from the inside of the through hole 42 and coated on the inner surface of the dustproof cap 42, and the cable 48 connected to the printed-wiring board 22 is soldered to the conductive material 46 extending out from the inside of the through hole 42b and coated on the outer surface of the dustproof cap 42. By closing the through hole 42b by soldering, the circuit board 24 and the printed-wiring board 22 are electrically connected to each other without passing the cables 47 and 48 through the dustproof cap 42. Thus, it is not necessary to provide an insertion hole or the like at the dustproof cap 42 for passing therethrough the cables 47 and 48. Further, the through hole 42b can be easily closed by soldering or the like. Accordingly, lowering of the dustproof property of the dustproof cap 42 can be prevented, which would be otherwise caused by connecting the circuit board 24 and the printed-wiring board 22 via the cables 47 and 48.

Figure 7:
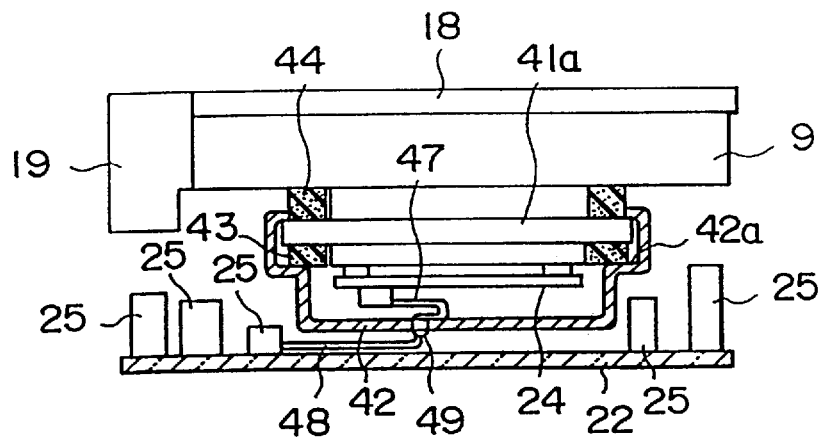
FIG. 7 is a sectional side view showing a main portion of an optical disk drive unit according to a fifth preferred embodiment of the present invention.

FIG. 7 is a sectional side view showing a main portion, corresponding to FIG. 3, of an optical disk drive unit according to a fifth preferred embodiment of the present invention. In the figure, numeral 49 denotes at least one terminal pin penetrating the bottom of the dustproof cap 42. Typically, there is a plurality of terminal pins, with one terminal pin for every conductor of a cable that must pass through the cap. The cable 47 connected to the circuit board 24 is soldered to one end portion of the terminal pin 49 in the dustproof cap 42, while the cable 48 connected to the printed-wiring board 22 is soldered to the other end portion of the terminal pin 49 outside the dustproof cap 42.

In this preferred embodiment, the terminal pin 49 penetrates the dustproof cap 42, the cable 47 connected to the circuit board 24 is soldered to the terminal pin 49, and the cable 48 connected to the printed-wiring board 22 is soldered to the terminal pin 49. Thus, since the circuit board 24 and the printed-wiring board 22 can be electrically connected to each other without passing the cables 47 and 48 through the dustproof cap 42, it is not necessary to provide an insertion hole or the like at the dustproof cap 42 for passing therethrough the cables 47 and 48. Accordingly, lowering of the dustproof property of the dustproof cap 42 can be prevented, which would be otherwise caused by connecting the circuit board 24 and the printed-wiring board 22 via the cables 47 and 48.

Figure 8:
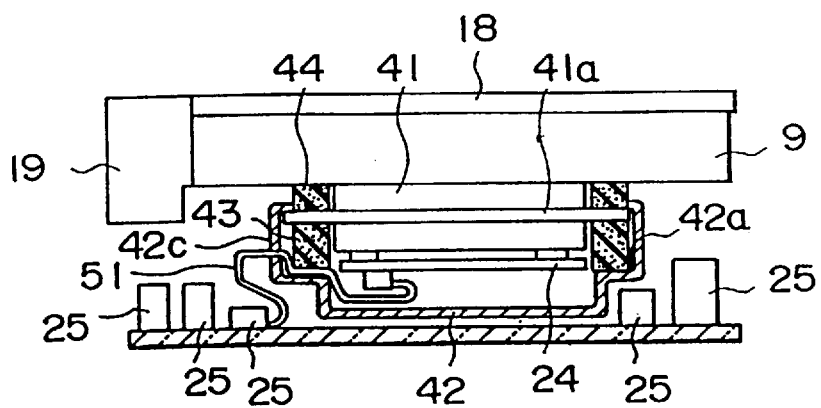
FIG. 8 is a sectional side view showing a main portion of an optical disk drive unit according to a sixth preferred embodiment of the present invention.

FIG. 8 is a sectional side view showing a main portion, corresponding to FIG. 3, of an optical disk drive unit according to a sixth preferred embodiment of the present invention. In the figure, numeral 42c denotes an insertion hole formed through the side of the dustproof cap 42, and numeral 51 an FPC board used as a flexible cable for electrically connecting the circuit board 24 and the printed-wiring board 22 to each other. The FPC board connected to the circuit board 24 extends out to the exterior of the dustproof cap 42 via the insertion hole 42c so as to be connected to the printed-wiring board 22. Further, in the dustproof cap 42, since a scaled space inside the lower sealing member 43 is screened from the insertion hole 42c by the lower sealing member 43, the FPC board is disposed between the lower sealing member 43 and the step 42a. Even if the FPC board is disposed between the lower sealing member 43 and the step 42a, since the compressed lower sealing member 43 is pressed on the FPC board 51 to be deformed following the shape of the FPC board 51, no gap is generated between the lower sealing member 43 and the FPC board 51 and between the FPC board 51 and the step 42a for the dust to pass through.

In this preferred embodiment, the dustproof cap 42 is formed with the insertion hole 42c, the scaled space inside the dustproof cap 42 is screened from the insertion hole 42c by means of the lower sealing member 43, and the FPC board 51 connecting the circuit board 24 and the printed-wiring board 22 to each other is disposed between the lower sealing member 43 and the step 42a and passes through the insertion hole 42c. Thus, the circuit board 24 and the printed-wiring board 22 are electrically connected to each other by the FPC board 51, and further, invasion of the dust into the sealed space inside the dustproof cap 42 via the insertion hole 42c can be prevented. Further, since no operation is required for soldering the two cables 47 and 48 for connection between the circuit board 24 and the printed-wiring board 22, the assembling operation can be facilitated and the number of parts can be reduced as compared with the foregoing fourth or fifth preferred embodiment. Further, since the lower sealing member 43 is made of the conductive material, invasion of the electromagnetic wave noise via the insertion hole 42c is also prevented.

Figure 9:
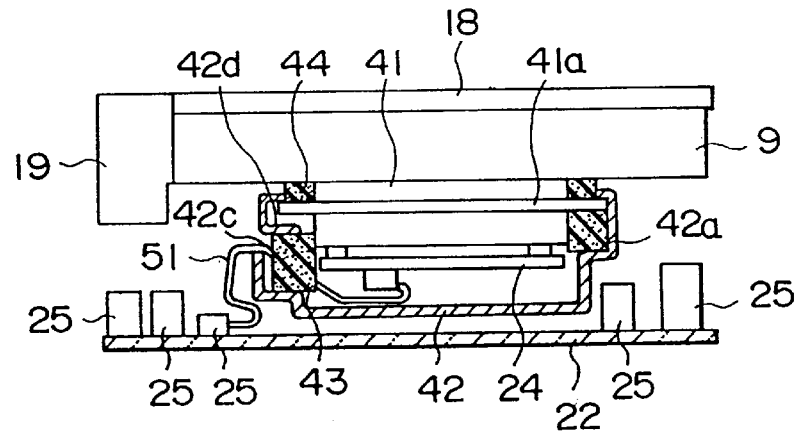
FIG. 9 is a sectional side view showing a main portion of an optical disk drive unit according to a seventh preferred embodiment of the present invention.
Figure 10:
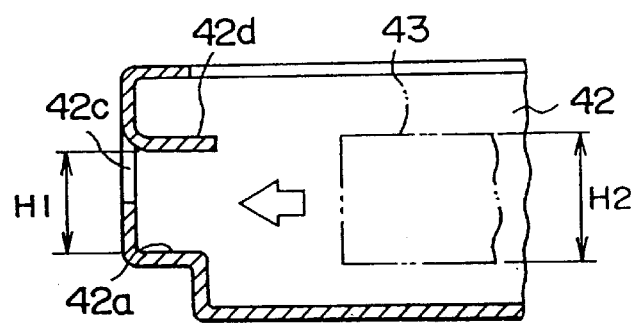
FIG. 10 is a sectional view of the neighborhood of an insertion hole at a failing-off prevention portion shown in FIG. 9.

FIG. 9 is a sectional side view showing a main portion, corresponding to FIG. 3, of an optical disk drive unit according to a seventh preferred embodiment of the present invention, and FIG. 10 is a sectional view of the neighborhood of the insertion hole at a falling off projection portion shown in FIG. 9. In the figures, numeral 42d denotes a projection portion formed by bending inward an end portion of the insertion hole 42c. The lower sealing member 43 near the insertion hole 42c is held in a compressed state between the projection portion 42d and a portion of the step 42a confronting the projection portion 42d so that the projecting portion hold the sealing member 43 on duplicated cap 42 preventing it from falling off. As shown in FIG. 10, if a holding width between the underside of the projection portion 42d and the step 42a is given by H1 and a thickness of the lower sealing member 43 near the insertion hole 42c at the time of non-deformation is given by H2, H1<H2 is set. With this arrangement, since the lower sealing member 43 is compressed between the failing-off prevention portion 42d and the step 42a, adherence of the lower sealing member 43 relative to the step 42a, the failing-off prevention portion 42d and the FPC board 51 can be enhanced so as to improve the sealing effect of the lower sealing member 43 relative to the insertion hole 42c.

In this preferred embodiment, since the dustproof cap 42 is provided with the falling-off prevention portion 42d for holding the lower sealing member 43, the lower sealing member 43 near the insertion hole 42c, which tends to move during a connecting operation for the FPC board 51, is prevented from moving and falling off the step 42a so that lowering of the sealing between the scaled space inside the dustproof cap 42 and the insertion hole 42c due to movement or falling-off of the lower sealing member 43 can be prevented.

Figure 11:
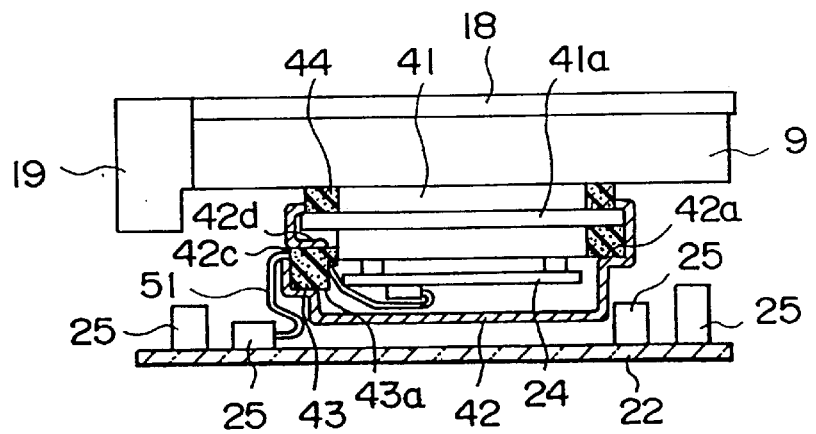
FIG. 11 is a sectional side view showing a main portion of an optical disk drive unit according to an eighth preferred embodiment of the present invention.
Figure 12:
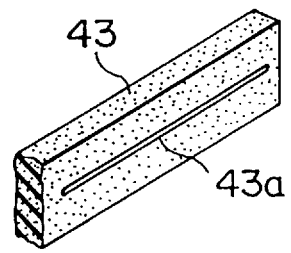
FIG. 12 is a perspective view of a portion, where a slit or a cut line is formed, of a lower sealing member shown In FIG. 11.

FIG. 11 is a sectional side view showing a main portion, corresponding to FIG. 3, of an optical disk drive unit according to an eighth preferred embodiment of the present invention, and fIG. 12 is a perspective view of a portion, where a slit or a cut line is formed, of the lower sealing member shown in FIG. 11. In the figures, the lower sealing portion 43 is formed at its portion facing the insertion hole 42c with a transversely elongate slit 43a. The FPC board 51 connected to the circuit board 24 extends out to the exterior of the dustproof cap 42 via the slit 43a and the insertion hole 42c so as to be connected to the printed-wiring board 22. As described above, since H1<H2, the lower sealing member 43 held between the falling off prevention portion 42d and the step 42a is compressed. Thus, the lower sealing member 43 abuts tight the FPC board 51 in the slit 43a with no gap therebetween so that the slit 43a is closed.

In this preferred embodiment, as compared with the foregoing seventh preferred embodiment, the deformation of the FPC board due to a tensile force is suppressed so that generation of gaps between the lower sealing member 43 and the FTC board 51 and between the lower sealing member 43 and the dustproof cap 42 can be prevented. Thus, the sealing effect of the lower sealing member 43 relative to the insertion hole 42c can be further improved.

Figure 13:
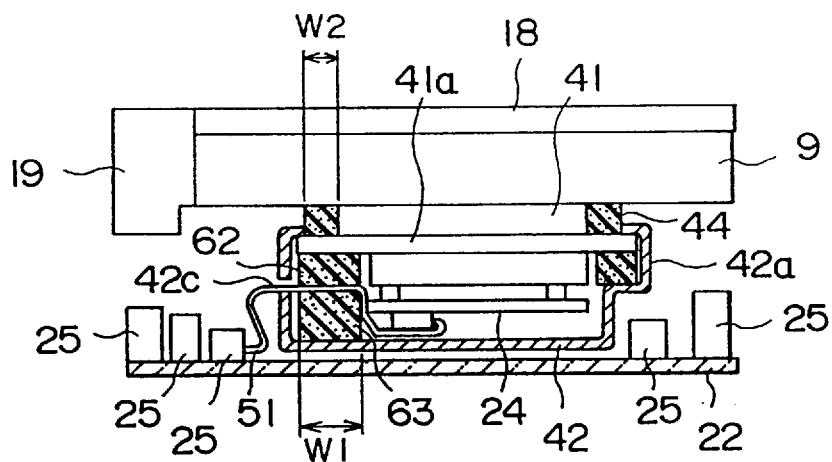
FIG. 13 is a sectional side view showing a main portion of an optical disk drive unit according to a ninth preferred embodiment of the present invention.
Figure 14:
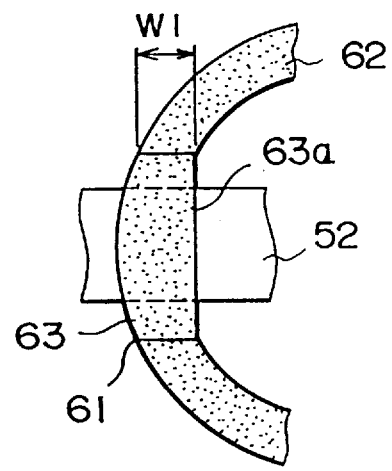
FIG. 14 is a bottom view of a portion of a lower sealing member, shown in FIG. 13, in the neighborhood of an insertion hole.

FIG. 13 is a sectional side view showing a main portion, corresponding to FIG. 3, of an optical disk drive unit according to a ninth preferred embodiment of the present invention, and FIG. 14 is a bottom view of a portion of a lower sealing member, shown in FIG. 13, in the neighborhood of the insertion hole. In the figures, numeral 61 denotes a lower sealing member for sealing between the body module 41 and the dustproof cap 42 and screening the receiving space for the circuit board 24 from the insertion hole 42c. The lower sealing member 61 has a two-piece structure composed of a ring-shaped body portion 62 and a divided piece 63 adhered to the body portion 62 near the insertion hole 42c. Each of the body portion 62 and the divided piece 63 is made of an elastic conductive material. The FPC board 51 connected to the circuit board 24 extends out to the exterior of the dustproof cap 42 passing between the body portion 62 and the divided piece 63 and the insertion hole 42c so as to be connected to the printed-wiring board 22.

Since a turntable of the spindle motor 17 and the optical head 16 moving at a given stroke are arranged on the upper side of the body module 41, the upper side of the body module 41, excluding the press-in plate 41a, should be normally set larger in area than the underside thereof. Thus, a width W2 of the upper sealing member 44 is limited. However, since the upper sealing member 44 is of an integral structure, even if the width W2 is small, the sealing between the body module 41 and the opening 9a of the loading base 9 is fully ensured. On the other hand, since the lower sealing member 61 is of a two-piece structure, if a width, as measured in the insertion direction of the FPC board, is small, invasion of the dust between the body portion 62 and the divided piece 63 may be possible. Therefore, a minimum width W1 of abutting surfaces of the body portion, 62 and the divided piece 63 as measured in the insertion direction of the FPC board 51 is set larger than the width W2 of the upper sealing member 44 so as to ensure a sufficient contact area between the body portion 62 and the divided piece 63.

Further, the FPC board 51 is bent along an inner edge portion 63a of the divided piece 63 in the dustproof cap 42. As shown in FIG. 14, this inner edge portion 63a extends linearly. If the edge portion 63a is curved, a force is applied to the FPC board 51 by the edge portion 63a to bend the FPC board 51 in a width direction. Thus, even if a sufficient contact area is ensured, a gap tends to be generated between the body portion 62 and the divided piece 63 along the FPC board 51. If it is arranged to bend the FPC board 51 along the body portion 62 rather than along the inner edge portion 63a of the divided piece 63, at least an edge portion of the body portion 62 to abut the FPC is formed linear so as to prevent curving of the FPC board 51 to thus prevent generation of a gap between the body portion 62 and the divided piece 63.

In this preferred embodiment, as compared with the foregoing, eighth preferred embodiment, since it is not necessary to insert the FPC board 51 into the narrow slit 43a, the assembling efficiency can be improved. Further, the minimum width W1 of the abutting surfaces of the body portion 62 and the divided piece 63 is set greater than the width W2 of the upper sealing member 44, and the edge portion 63a of the divided piece 63 is formed linear. Thus, the contact area between the body portion 62 and the divided piece 63 is sufficiently ensured, and further, generation of the gap between the body portion 62 and the divided piece 63 due to curving of the FPC board in the width direction can be prevented. Accordingly, the sealing effect of the lower sealing member 43 relative to the insertion hole 42c is improved so as to prevent invasion of the dust via the insertion hole 42c.

Figure 15:
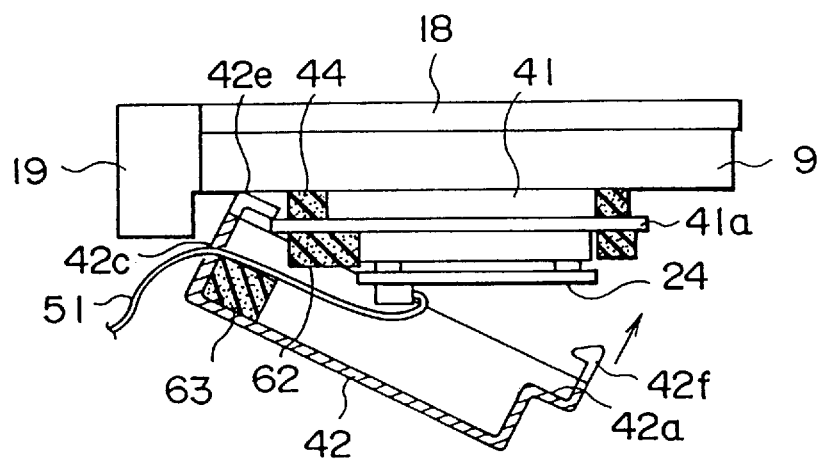
FIG. 15 is a sectional side view showing a main portion of an optical disk drive unit according to a tenth preferred embodiment of the present invention.

FIG. 15 is a sectional side view showing a main portion, corresponding to FIG. 3, of an optical disk drive unit according to a tenth preferred embodiment of the present invention. In the figure, numeral 42e denotes a fixed claw projecting from the upper end portion of the dustproof cap 42, and numeral 42f an elastic claw projecting from the upper end portion of the dustproof cap 42 at a position essentially facing the fixed claw 42e. The fixed claw 42e is arranged above the insertion hole 42c and has a high rigidity so as to be prevented from deformation due to an external force applied thereto. On the other hand, the elastic claw 42f has a sufficient elasticity so as to be deformable to an engaging position for engaging the press-in plate 41a and to a disengaging position for releasing the press-in plate 41a.

When attaching the dustproof cap 42 to the body module 41, the divided piece 63 is set in a given position of the dustproof cap 42 with the FPC board 51 passing through the insertion hole 42c. Then, as shown in FIG. 15, the dustproof cap 42 is held in a position where the fixed claw 42e engages the press-in plate 41a. Subsequently, with the elastic claw 42f elastically deformed to the disengaging position, the dustproof cap 42 is moved in an arrow direction with the fixed claw 42e as a fulcrum. Then, when the dustproof cap 42 is moved to a given mounting position, the elastic claw 42f is restored to the engaging position so that the dustproof cap 42 is fixed to the body module 41. At this time, the divided piece 63 set in the dustproof cap 42 abuts tight the body portion 62 with the FPC board 51 held therebetween. Further, the dustproof cap 42 fixed to the body module 41 is detachable by elastically deforming the elastic claw 42f to the disengaging position.

In this preferred embodiment, since the dustproof cap 42 is provided with the fixed claw 42e and the elastic claw 42f, by elastically deforming the elastic claw 42f to the disengaging position, the dustproof cap 42 is detachable relative to the body module 41. Further, since the fixed claw 42e has the high rigidity, the deformation of the dustproof cap 42 near the insertion hole 42c is prevented in the state where the dustproof cap 42 is attached to the body module 41. Thus, the insertion hole 42c is reliably blocked by the body portion 62 and the divided piece 63.

Figure 16:
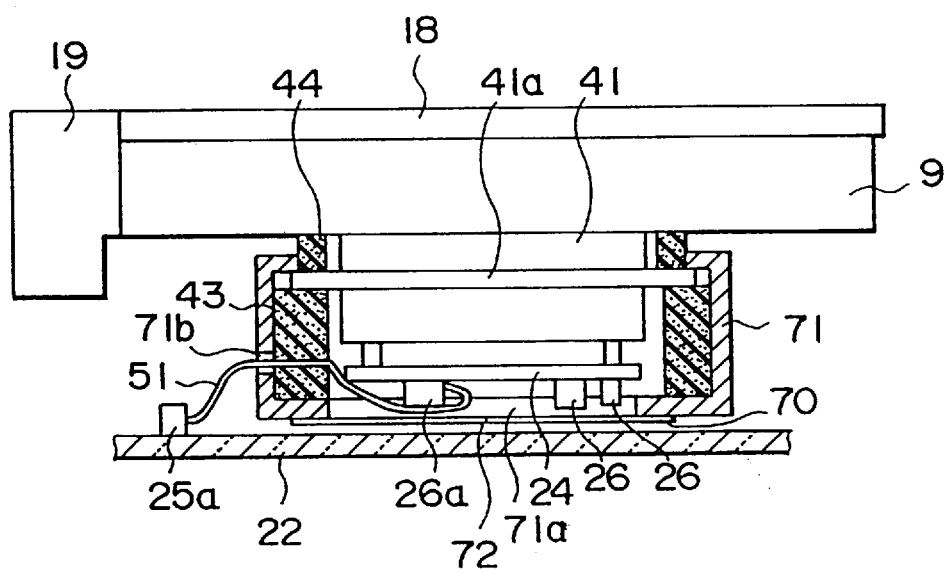
FIG. 16 is a sectional side view showing a main portion of an optical disk drive unit according to an eleventh preferred embodiment of the present invention.

FIG. 16 is a sectional side view showing a main portion, corresponding to FIG. 3, of an optical disk drive unit according to an eleventh preferred embodiment of the present invention. In the figure, numeral 70 denotes a dustproof cap attached to the body module 41 so as to cover the whole underside of the body module 41 where the circuit board 24 is mounted. The dustproof cap 70 includes a cap body 71 fixed to the body module 41 and a plate-like cover 72 in the form of a thin flat plate. The cap body 71 has a bottom confronting the circuit board 24 and formed with a bottom opening 71a, so as to ensure clearances greater than a given value relative to mounted components 26 in the state where the cap body 71 is fixed to the body module 41. Further, the platelike cover 72 is formed thinner than the cap body 71 which is integrally formed of resin. The plate-like cover 72 is bonded to the underside of the cap body 71 so as to close the bottom opening 71a with no gap therebetween.

Each of the dustproof caps 21 and 42 described based on FIGS. 2 to 15 and the foregoing cap body 71 is formed of resin using a mold or the like, and generally has a thickness equal to or greater than 1 mm, satisfying the demands in view of strength and accuracy. Further, in each of the dustproof caps 21 and 42, for ensuring clearances greater than a given value relative to the components 26 mounted on the circuit board 24 and for effectively arranging the relatively high components 25 on the printed-wiring board 22, the bottom thereof has a concave shape only in the neighborhood of a portion confronting the circuit board 24. For arranging such a dustproof cap 21, 42 between the circuit board 24 and the printed-wiring board 22, a space greater than a thickness of the dustproof cap 21, 42 should be at least ensured in the drive unit. For suppressing increment of the thickness of the drive unit, it is preferable to set a thickness of the dustproof cap 21, 42 to be thinner. However, as described above, the thickness of the integral dustproof cap 21, 42 should be equal to or greater than 1 mm due to the demands in light of strength and accuracy.

On the other hand, in the dustproof cap 70, the bottom confronting the circuit board 24 is formed with the bottom opening 71a. Further, as shown In FIG. 16, the tips of the relatively high components 26 are received in the bottom opening 71a, but do not project beyond the bottom of the dustproof cap 70, and the bottom opening 71a is closed by the plate-like cover 72 in this state. Since the plate-like cover 72 raises no problem in view of strength and accuracy even if it is very thin as compared with the dustproof caps 21 and 42 and the cap body 71, the thickness thereof can be set no more than 0.1 mm. Therefore, even if the plate-like cover 72 is bonded to the bottom of the cap body 71, increment of the thickness of the whole dustproof cap 70 in the height direction of the drive unit can be suppressed to no more than 0.1 mm. In the dustproof cap 70, the space corresponding to the thickness of the cap body 71 is formed by means of the bottom opening 71a closed by the plate-like cover 72. By means of this space, the clearances greater than the given value are ensured relative to the components 26 mounted on the circuit board 24.

In this preferred embodiment, the dustproof cap 70 is constituted by the cap body 71 formed with the bottom opening 71a and the plate-like cover 72 bonded to the bottom of the cap body 71 so as to close the bottom opening 71a. Thus, the dustproof cap 70 can be thinner in the height direction of the drive unit by a value essentially equal to the thickness of the dustproof cap 21, 42. Accordingly, the disk drive unit can be thinner in the height direction thereof as compared with using the dustproof cap 21, 42.

Further, in the optical disk drive unit shown in FIG. 16, the FPC board 51 connecting the circuit board 24 and the printed-wiring board 22 to each other has at its one end a socket (not shown) inserted into a connector 26a mounted on the circuit board 24. The FPC board 51 is bent into a U-shape in front of the connector 26a and then extends out to the exterior of the dustproof cap 70 passing through the slit in the lower sealing member 43 and the insertion hole 71b formed through the side of the cap body 71. Further, the FPC board 51 is provided at its other end outside the dustproof cap 70 with a socket (not shown) inserted into a connector 25a mounted on the printed-wiring board 22. The FPC board 51 of this type generally has constant elasticity and viscosity in a bending direction so as to be easily bent into the U-shape as shown in FIG. 16. On the other hand, in the state where no external force is exerted, the FPC board 51 is gradually restored to a shape close to the initial shape. Accordingly, if the FPC board 51 bent in the U-shape in a position confronting the plate-like cover 72 restores with a larger radius of curvature so as to abut the plate-like cover 72, the plate-like cover 72 is pressed due to a restoring force of the FPC board 51 so as to be separated from the underside of the cap body 71. Tis separation of the plate-like cover 72 caused by the FPC board can be prevented by providing constraining means for constraining the FPC board 51 not to restore in a direction approaching the plate-like cover 72. Now, examples of such constraining means will be described hereinbelow.

Figure 18:
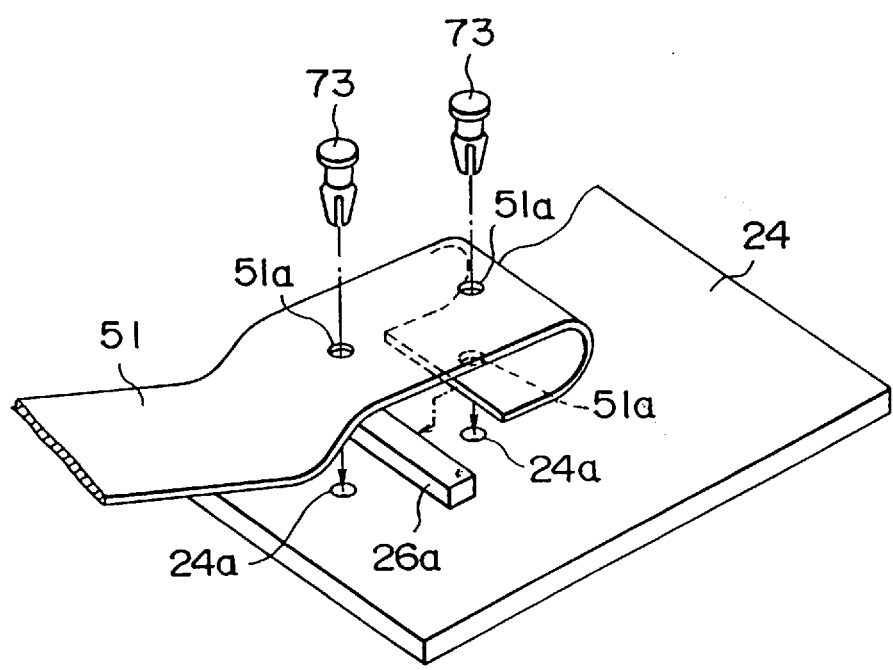
FIGS. 18 and 19 are a perspective view and a side view, respectively, showing an example of constraining means relative to an FPC board connecting a circuit board and a printed-wiring board shown in FIG. 16.
Figure 19:
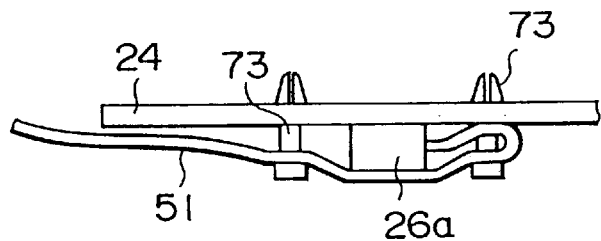

FIGS. 18 and 19 are a perspective view and a side view, respectively, showing an example of constraining means relative to the FPC board connecting the circuit board and the printed-wiring board shown in FIG. 16. In the circuit board 24, insertion holes 24*a* are formed at positions in forward and backward positions relative to the connector 26*a*. On the other hand, the FPC is also formed with insertion holes 51*a* at positions corresponding to the positions of the insertion holes 24*a* in the state where the FPC board 51 is inserted into the connector 26*a*. Each insertion hole 51*a* has a diameter substantially equal to that of each insertion hole 24*a*. At this time, in the forward position of the connector 26*a*, the FPC board 51 is bent into a U-shape to overlap so that the two insertion holes 51*a* are in alignment with the corresponding insertion hole 24*a*.

On the other hand, numeral 73 denotes an engaging pin with its tip portion having a conical or pyramid shape. The engaging pin has a step between the tip portion and an intermediate portion. Further, the tip portion of the engaging pin 73 is formed with slits in an insertion direction relative to the insertion holes 24*a* and 51*a*. Upon insertion of the engaging pin 73 relative to the insertion holes 24*a* and 51*a*, the tip portion is pressed by the insertion holes 24*a* and 51*a* so that the tip portion is elastically deformed to reduce an open width of each slit. Thus, a maximum diameter of the tip portion of the engaging pin 73 becomes smaller than the diameter of the insertion hole 24*a*, 51*a*.

When connecting the FPC board 51 to the circuit board 24, after inserting the FPC board 51 into the connector 26*a*, the FPC is bent twofold into a U-shape in the forward position of the connector 26*a*. In this state, the insertion holes 24*a* of the circuit board 24 and the insertion holes 51*a* of the FPC board 51 are positioned to be aligned with each other. Then, the engaging pins 73 are inserted into the insertion holes 24*a* and 51*a* in the forward and backward positions of the connector 26*a*, respectively, so that the tip portions of the engaging pins 73 project from the backside of the circuit board 24.

With this arrangement, the FPC board 51 is constrained by the engaging pins 73 in the forward and backward positions of the connector 26*a* not to displace beyond a given distance from the circuit board 24. Further, although the tip portion of the engaging pin 73 is pressed by the insertion holes 24*a* and 51*a* upon insertion relative to the insertion holes 24*a* and 51*a* so that its maximum diameter becomes smaller than the insertion holes 24*a* and 51*a*, when the tip portion of the engaging pin 73 projects from the backside of the circuit board 24, the tip portion thereof restores to be greater in diameter than the insertion holes 24*a* and 51*a* so that failing-off of the engaging pin 73 is prevented.

Since the FPC board 51 is constrained by the engaging pins 73 in the forward and backward positions of the connector 26*a* not to displace beyond a given distance from the circuit board 24, even if the FPC board 51 restores to be greater in its radius of curvature at the bent portion, the FPC board 51 is prevented from abutting the platelike cover 72 in the dustproof cap 70. Thus, the separation of the plate-like cover 72 from the underside of the cap body 71 due to the restoring force of the FPC board 51 can be prevented.

Figure 20:
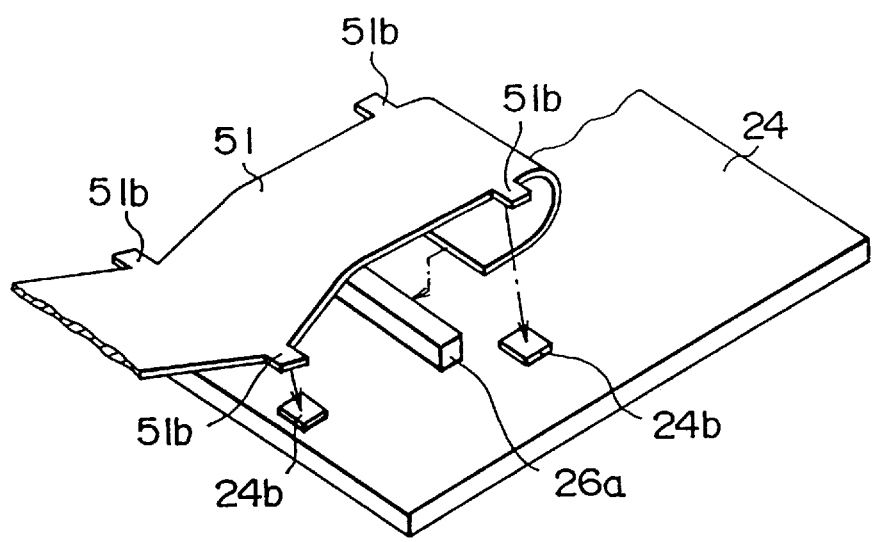
FIGS. 20 and 21 are a perspective view and a side view, respectively, showing another example of constraining means relative to an FPC board connecting a circuit board and a printed-wiring board shown in FIG. 16.
Figure 21:
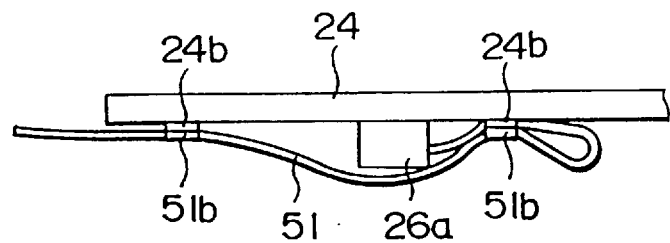

FIGS. 20 and 21 are a perspective view and a side view, respectively, showing another example of constraining means relative to the FPC board connecting the circuit board and the printed-wiring board shown in FIG. 16. In the circuit board 24, a pair of soldering patterns 24*b* at a pitch substantially corresponding to a width of the FPC board 51 are arranged in each of the forward and backward positions of the connector 26*a*. The FPC board 51 are also provided with corresponding soldering pattern pieces 51*b* projecting from both sides of the FPC board 51. The soldering pattern pieces 51*b* confront the corresponding soldering patterns 24*b* in the state where the FPC board 51 is inserted into the connector 26*a* and bent into a U-shape. At this time, although the FPC board 51 is bent twofold into the U-shape in the forward position of the connector 26*a*, the FPC is provided with the soldering pattern pieces 51*b* only at the upper layer thereof.

When connecting the FPC board 51 to the circuit board 24, after inserting the FPC 51 into the connector 26*a*, the FPC board is bent twofold into the U-shape in the forward position of the connector 26*a*. In this state, the soldering pattern pieces 51*b* of the FPC board 51 are superposed over the soldering patterns 24*b* of the circuit board 24, and then, the soldering pattern pieces 51*b* are soldered to the soldering patterns 24*b* in the forward and backward positions of the connector 26*a*. With this arrangement, the FPC board 51 is constrained due to the soldering in the forward and backward positions of the connector 26*a* so as to adhere to the circuit board 24.

Since the FPC 51 is constrained by the soldering in the forward and backward positions of the connector 26*a* so as to adhere to the circuit board 24, even if the FPC 51 restores to be greater in its radius of curvature at the bent portion, the FPC 51 is prevented from abutting the plate-like cover 72 in the dustproof cap 70. Thus, the separation of the plate-like cover 72 from the underside of the cap body 71 due to the restoring force of the FPC board 51 can be prevented.

Figure 22:
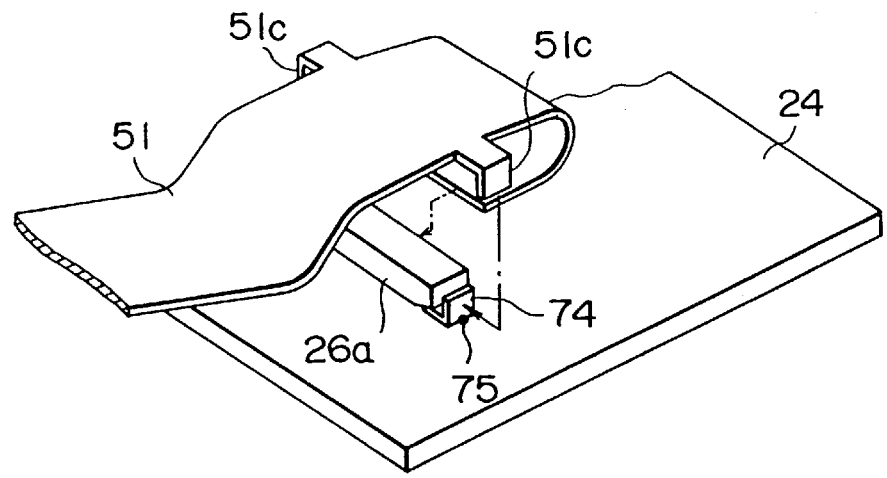
FIGS. 22 and 23 are a perspective view and a side view, respectively, showing another example of constraining means relative to an FPC board connecting a circuit board and a printed-wiring board shown in FIG. 16.
Figure 23:
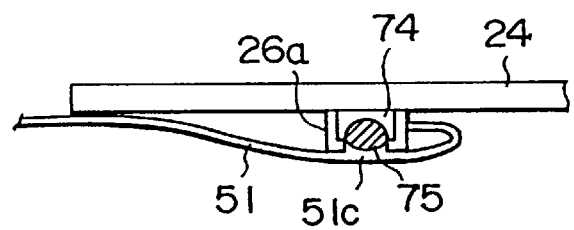

FIGS. 22 and 23 are a perspective view and a side view, respectively, showing another example of constraining means relative to the FPC board connecting the circuit board and the printed-wiring board shown in FIG. 16. Numeral 74 denotes a metal fixing member for fixing the connector 26*a* to the circuit board 24. The fixing member 74 is soldered on the circuit board 24 by a solder 75. The connector 26*a* is fixed to the fixing member 74 by means of screws or by certain engagement between the connector 26*a* and the fixing member 74. The FPC 51 is provided with a pair of soldering pattern pieces 51*c* projecting from both sides of the FPC board 51 at positions spaced from the tip of the FPC 51 by a given distance. Each of the soldering pattern pieces 51*c* has an L-shape, and a distance between confronting portions of the soldering pattern pieces 51*c* is set substantially equal to a distance between the outer side surfaces of the fixing members 74.

When connecting the FPC board 51 to the circuit board 24, after the FPC 51 is inserted into the connector 26*a*, the FPC 51 is bent twofold in the forward position of the connector 26*a* so as to position the soldering pattern pieces 51*c* to abut the outer side surfaces of the fixing members 74. Then, the soldering pattern pieces 51*c* are soldered to the outer side surfaces of the fixing members 74 by the solder 75. With this arrangement, the FPC board 51 is fixed to the fixing member 74, which supports the connector 26*a*, by the solder 75 on the circuit board 24 so that the neighborhood of the bent portion of the FPC board 51 is constrained not to move in a direction away from the circuit board 24.

Since the FPC board 51 is fixed to the fixing member 74, which supports the connector 26*a*, by the solder 75 on the circuit board 24 so that the neighborhood of the bent portion of the FPC board 51 is constrained not to move in a direction away from the circuit board 24, even if the FPC 51 restores to be greater in its radius of curvature at the bent portion, the FPC 51 is prevented from abutting the plate-like cover 72 in the dustproof cap 70. Thus, the separation of the platelike cover 72 from the underside of the cap body 71 due to the restoring force of the FPC board 51 can be prevented.

Figure 24:
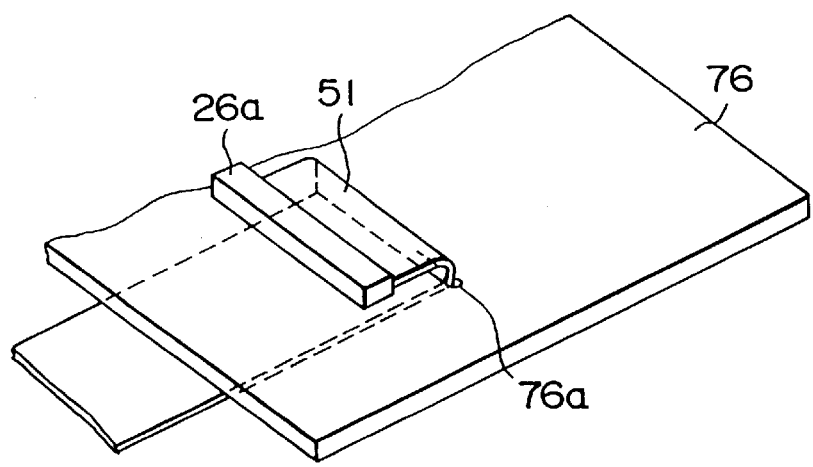
FIGS. 24 and 25 are a perspective view and a side view, respectively, showing another example of a circuit board In the optical disk drive unit shown in FIG. 16.
Figure 25:
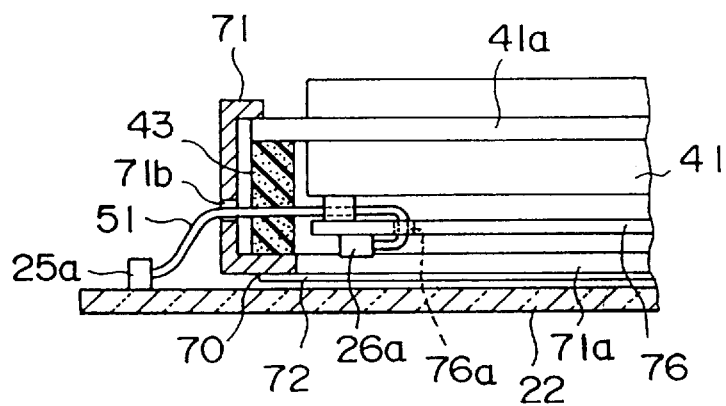

FIGS. 24 and 25 are a perspective view and a side view, respectively, showing another example of the circuit board in the optical disk drive unit shown in FIG. 16. Numeral 76 denotes a circuit board which is attached to the body module 41 like the circuit board 24 and has its mounting surface on which the components 26 such as the connector 26a are mounted. In this circuit board 76, a slit 76a for the component 26 is formed, as penetrating the circuit board 76, in the forward position of the connector 26a.

When connecting the FPC board 51 to the circuit board 76, before or after the FPC board 51 is inserted into the connector 26a, the FPC board 51 is inserted through the slit 76a so as to be taken out on the backside of the circuit board 76 from the mounting side thereof. The FPC 51 board extends out to the exterior of the dustproof cap 70 from the backside of the circuit board 76. In this state, if the FPC 51 is not inserted into the connector 26a, one end portion of the FPC 51 is inserted into the connector 26a. Then, the other end portion of the FPC 51 is inserted into the connector 26a of the printed-wiring board 22. With this arrangement, even if the FPC 51 restores to be greater in its radius of curvature at the bent portion, the FPC 51 moves in a direction opposite to the plate-like cover 72 so that the FPC 51 is prevented from abutting the plate-like cover 72 in the dustproof cap 70 without providing the constraining means relative to the FPC 51. Thus, the separation of the plate-like cover 72 from the underside of the cap body 71 due to the restoring force of the FPC board 51 can be prevented.

Figure 17:
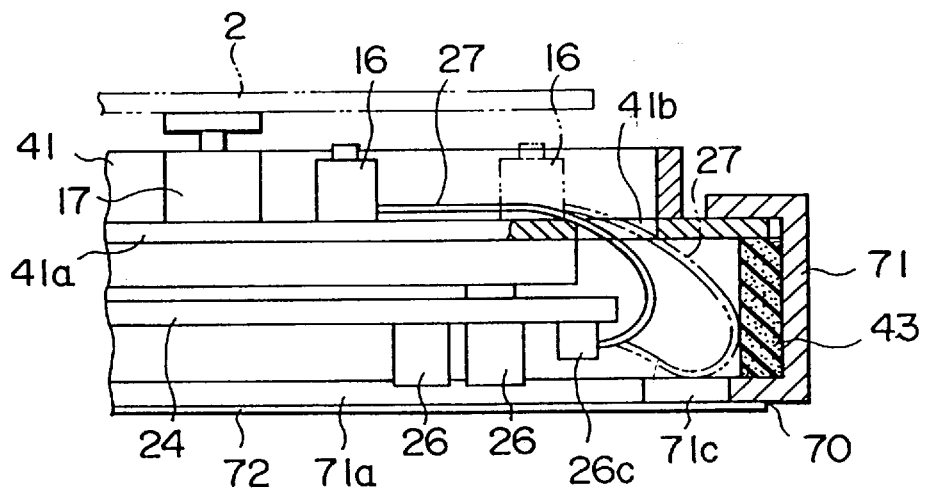
FIG. 17 is a sectional side view showing a main portion of an optical disk drive unit according to a twelfth preferred embodiment of the present invention.

FIG. 17 is a sectional side view showing a main portion, corresponding to FIG. 3, of an optical disk drive unit according to a twelfth preferred embodiment of the present invention. In the figure, the optical head 16 is arranged on the body module 41 so as to confront the optical disk 2, and is movable in a radial direction of the optical disk 2. A flexible cable 27 connected to the optical head 16 passes through a cable insertion hole 41b penetrating the press-in plate 41a so as to reach the underside of the body module 41 where a socket (not shown) provided at the tip of the flexible cable 27 is inserted into the connector 26c mounted on the circuit board 24. The flexible cable 27 has a length which allows the optical head 16 to move freely within a moving stroke range in the foregoing radial direction. When the optical head 16 moves in the radial direction from an innerside position identified by solid line to an outer-side position identified by chain line, the flexible cable 27 also moves outward in the radial direction following the optical head 16 so that the flexible cable 27 is fed out from the upper side of the body module 41 into the dustproof cap 70. As a result, the bent portion of the flexible cable 27 moves outward in the radial direction within the dustproof cap 70 and hangs down toward the bottom of the dustproof cap 70.

On the other hand, the bottom of the cap body 71 is formed with the bottom opening 71a. In this preferred embodiment, along a moving route of the bent portion of the flexible cable 27 which moves following the movement of the optical head 16, a cable holding portion 71c is formed by projecting the bottom plate of the cap body 71 inward in the radial direction of the optical disk 2.

In this preferred embodiment, by providing the cable holding portion 71c at the bottom of the cap body 71, even when the bent portion of the flexible cable 27 hangs down to reach the bottom of the dustproof cap 70 as following the movement of the optical head 16, the cable holding portion 71c holds the bent portion of the flexible cable 27 so as to prevent the bent portion of the flexible cable 27 from abutting the plate-like cover 72. If, as shown in FIG. 16, the cable holding portion 71c is not provided at the bottom of the cap body 71, it is possible that the bent portion of the flexible cable 27 hanging down into the dustproof cap 70 abuts the plate-like cover 72. Upon abutment, a force is exerted on the plate-like cover 72 to separate it from the cap body 71. Thus, if the bent portion of the flexible cable 27 abuts the plate-like cover 72 repeatedly, the possibility of the plate-like cover 72 to come off the cap body 71 increases with increment of an operation time of the drive unit. Particularly, when the plate-like cover 72 is attached to the cap body 71 by means of adhesive, since a temperature in the dustproof cap 70 increases up to a high value during operation of the drive unit, it is possible that the plate-like cover 72 is separated for a extremely short time due to abutment with the flexible cable 27.

While the present invention has been described in terms of the preferred embodiments, the invention is not to be limited thereto, but can be embodied in various ways without departing from the principle of the invention as defined in the appended claims.

What is claimed is:

1. A disk drive unit comprising:

a casing having an insertion/ejection opening;

a loading mechanism for holding a disk-shaped recording medium inserted through said insertion/ejection opening and transferring said recording medium to a recording/reproducing position;

a recording/reproducing head for recording/reproducing information relative to the disk-shaped recording medium transferred to said recording/reproducing position;

a circuit board for processing an input/output signal relative to said recording/reproducing head;

a body module mounted at least with said recording/reproducing head and said circuit board and attached to an underside of a base of said loading mechanism so as to cover an opening of said loading mechanism;

a printed-wiring board electrically connected to said circuit board;

at least one dustproof member for forming a receiving space for the disk-shaped recording medium cooperatively with said loading base attached with said body module;

a dustproof cap attached to said body module so as to cover an underside of said body module where said circuit board is mounted; and an elastic lower sealing member for sealing between said body module and said dustproof cap, and an elastic upper sealing member for sealing between said body module and said loading base.

2. The disk drive unit according to claim 1, wherein said at least one dustproof member substantially closes said receiving space except upon insertion/ejection of the disk-shaped recording medium.

3. The disk drive unit according to claim 2, wherein a component mounting surface of said printed-wiring board confronts said underside of said base.

4. The disk drive unit according to claim 3, wherein said dustproof cap is made of non-conductive resin.

5. The disk drive unit according to claim 2, wherein a press-in plate is projected from and extended over an outer side surface of said body module, wherein said upper sealing member is compressed between the underside of said loading base and an upper side of said press-in plate, and wherein said lower sealing member is compressed in said dustproof cap between said dustproof cap and an underside of said press-in plate.

6. The disk drive unit according to claim 5, wherein said dustproof cap includes a through hole with its inner surface coated with a conductive material, wherein a cable connected to said circuit board is soldered to a portion of said conductive material extending out from said through hole and coated on an inner surface of said dustproof cap, and wherein a second cable connected to said printed-wiring board is soldered to a portion of said conductive material extending out from said through hole and coated on an outer surface of said dustproof cap.

7. The disk drive unit according to claim 5, wherein a terminal pin made of a conductive material penetrates said dustproof cap, wherein a cable connected to said circuit board in said dustproof cap is soldered to one end of said terminal pin, and wherein a second cable connected to said printed-wiring board outside said dustproof cap is soldered to the other end of said terminal pin.

8. The disk drive unit according to claim 5, wherein said dustproof cap includes a cable insertion hole, wherein a sealed space in said dustproof cap is screened from said cable insertion hole by said lower sealing member, and wherein a flexible cable connecting between said circuit board and said printed-wiring board passes between said lower sealing member and said dustproof cap and further passes through said cable insertion hole.

9. The disk drive unit according to claim 8, wherein each of said upper sealing member and said lower sealing member is made of a conductive material.

10. The disk drive unit according to claim 8, wherein said dustproof cap is provided with a high-rigidity fixed claw for engaging said body module, and wherein said dustproof cap is further provided with an elastic claw at a position facing said fixed claw, said elastic claw deformable to an engaging position for engaging said body module and a disengaging position for releasing said body module.

11. The disk drive unit according to claim 10, wherein said fixed claw is located above said cable insertion hole.

12. The disk drive unit according to claim 5, wherein said dustproof cap includes a cable insertion hole, wherein a sealed space in said dustproof cap is screened from said cable insertion hole by said lower sealing member, and wherein a flexible cable connecting between said circuit board and said printed-wiring board passes through a slit formed in said lower sealing member and further through said cable insertion hole.

13. The disk drive unit according to claim 12, wherein said dustproof cap is provided with a projection portion near said cable insertion hole for holding said lower sealing member.

14. The disk drive unit according to claim 13, wherein a thickness of said lower sealing member with no deformation is set greater than a width defined as being between said projection portion and said dustproof cap.

15. The disk drive unit according to claim 5, wherein said dustproof cap includes a cable insertion hole, wherein a sealed space in said dustproof cap is screened from said cable insertion hole by said lower sealing member, wherein said lower sealing member has a divided structure near said cable insertion hole, said divided structure including a body portion and a divided piece, and wherein a flexible cable connecting between said circuit board and said printed-wiring board passes between said body portion and said divided piece and further through said cable insertion hole.

16. The disk drive unit according to claim 15, wherein a minimum width of mutually abutting surfaces of said divided piece and said body portion in an insertion direction of said flexible cable is set greater than a width of said upper sealing member, wherein said flexible cable is bent in said dustproof cap along an edge portion of one of said body portion and said divided piece.

17. The disk drive unit according to claim 16, wherein at least a portion of said edge portion abutting said flexible cable is formed linear.

18. The disk drive unit according to claim 1, wherein said dustproof cap includes a cap body, said cap body formed with an opening at its bottom confronting said circuit board and ensuring a clearance relative to a component mounted on said circuit board by means of said opening in a state where said cap body is fixed to said body module, said dustproof cap further including a plate member bonded to an underside of said cap body for closing said opening.

19. The disk drive unit according to claim 18, wherein said plate member is no greater than 0.1 millimeter.

20. The disk drive unit according to claim 18, wherein said recording/reproducing head is arranged on said body module at a position confronting said disk-shaped recording medium and movable in a radial direction of said disk-shaped recording medium, wherein said recording/reproducing head is connected to said circuit board arranged at the underside of said body module by means of a flexible cable having a length which allows movement of said recording/reproducing head, and wherein a cable holding portion is provided at the bottom of said cap body confronting said circuit board for holding a bent portion of said flexible cable which moves depending on a position of said recording/reproducing head.

21. The disk drive unit according to claim 18, wherein said circuit board and said printed-wiring board are connected to each other by means of a flexible cable, said flexible cable having one end connected to a connector member on said circuit board and being bent into a U-shape in said dustproof cap and extending out from said dustproof cap.

22. The disk drive unit according to claim 21 further comprising at least one constraining member for constraining said flexible cable on said circuit board for preventing said flexible cable from moving toward said plate member in said cap body.

23. The disk drive unit according to claim 22, wherein said constraining member includes a soldering pattern on said circuit board adjacent to said connector member, wherein said flexible cable is provided with a soldering pattern piece which can be soldered relative to said soldering pattern, and wherein said soldering pattern piece is soldered to said soldering pattern for preventing said flexible cable from moving toward said plate member in said cap body.

24. The disk drive unit according to claim 21, further comprising said connector member fixed onto said circuit board by a metal fixing member that is soldered onto said circuit board, and at least one constraining member including a soldering pattern piece provided at said flexible cable that is soldered to said metal fixing member for preventing said flexible cable from moving toward said plate member in said cap body.

25. The disk drive unit according to claim 21, wherein said circuit board is formed with a slit confronting said plate member and penetrating from a mounting surface of said circuit board on which said connector member is mounted, to a backslide of said circuit board, and wherein a bent portion of said flexible cable passes said slit from said mounting surface to said backside so that said flexible cable extends out to the exterior of said dustproof cap from said backside of the circuit board.

26. The disk drive unit according to claim 5, wherein each of said upper sealing member and said lower sealing member is made of a conductive material.

* * * * *